United States Patent
Yanaga et al.

(10) Patent No.: US 7,990,688 B2
(45) Date of Patent: Aug. 2, 2011

(54) GAS-INSULATED SWITCHGEAR

(75) Inventors: Hironori Yanaga, Chiba (JP); Yasunori Sanada, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 199 days.

(21) Appl. No.: 12/406,535

(22) Filed: Mar. 18, 2009

(65) Prior Publication Data

US 2009/0237870 A1    Sep. 24, 2009

(30) Foreign Application Priority Data

Mar. 19, 2008    (JP) .................................. 2008-071707

(51) Int. Cl.
*H02B 1/20*    (2006.01)
*H02B 7/01*    (2006.01)
*H02B 5/06*    (2006.01)

(52) U.S. Cl. .......................... 361/612; 361/604; 361/618
(58) Field of Classification Search .................. 361/618, 361/601–602, 604–605, 612

See application file for complete search history.

(56) References Cited

U.S. PATENT DOCUMENTS

| 3,778,574 A | * | 12/1973 | Clark | ............................... 218/79 |
| 4,486,634 A | * | 12/1984 | Nakano et al. | .................. 218/55 |
| 4,638,403 A | * | 1/1987 | Amano et al. | ................. 361/612 |
| 2002/0149904 A1 | * | 10/2002 | Hachida et al. | ............... 361/605 |

FOREIGN PATENT DOCUMENTS

| JP | 1-185108 | * | 7/1989 |
| JP | 3-159506 | | 7/1991 |
| JP | 3-265407 | * | 11/1991 |
| JP | 10-304521 | | 11/1998 |
| JP | 2003-219520 | | 7/2003 |

* cited by examiner

*Primary Examiner* — Zachary M Pape
(74) *Attorney, Agent, or Firm* — Oblon, Spivak, McClelland, Maier & Neustadt, L.L.P.

(57) ABSTRACT

A gas-insulated switchgear is provided, which can be made smaller and causes less increase in length in the circuit direction, by means of an improvement to the layout configuration of the operating rod of a bus-use grounding switch. Operating rods of bus-use grounding switches are vertically disposed so as to be substantially perpendicular to the buses, and operating devices are disposed along an extension of the operating rods, respectively. Bus-use voltage transformers are horizontally disposed in such a manner that they vertically overlap each other, and are respectively connected in the circuit breaker direction of the buses.

2 Claims, 7 Drawing Sheets

GAS-INSULATED SWITCHGEAR

TECHNICAL FIELD

The present invention relates to a gas-insulated switchgear in which a bus is disposed in front thereof, and more particularly relates to a gas-insulated switchgear in which an improvement has been made to the layout of an operating device for controlling a bus-use grounding switch.

RELATED ART

A gas-insulated switchgear generally has a bus apparatus unit in which a bus-use grounding switch is disposed on a bus, and a feeder circuit unit in which line-side apparatuses, a circuit breaker, and a bus-side disconnecting switch including a bus are continuously disposed. The line-side apparatuses here includes line-side disconnecting switches, line-side grounding switches, power cables, and other such devices.

More specifically, a gas-insulated switchgear is configured such that a plurality of feeder circuit units employing "front bus arrangement" (in which a bus being disposed in front of the circuit units) are continuously disposed, and these feeder circuit units are mechanically and electrically connected by a bus and are provided in the same direction. Furthermore, a bus apparatus unit has a bus-use grounding switch, a voltage transformer, or the like, which are required to confirm whether or not voltage is applied to the bus, and is connected to the bus of the feeder circuit. In general, an operating device is linked via an operating rod to the grounding switch.

The following layout configurations have been proposed for operating devices of bus-use grounding switches in bus apparatus units. For example, with the technique discussed in Japanese Patent Application Laid-Open 2003-219520, a voltage transformer is provided in the same direction as the disconnecting switch with respect to the bus, while an operating rod of a bus-use grounding switch is provided in the opposite direction from that of the disconnecting switch, so that the operating rod is disposed in the opposite direction from the disconnecting switch.

With the technique discussed in Japanese Patent Application Laid-Open H10-304521, a gas container of a bus apparatus unit is formed in a cross shape by a header and the branch pipes that intersect at the header, and an operating device is attached to the branch pipes in the opposite direction from a circuit breaker. Furthermore, with the technique described in Japanese Patent Application Laid-Open H3-159506, operating devices are disposed facing each other in the up and down direction of the operating shaft via a coupling link, and are introduced in mutually opposite directions.

However, the following problems have been indicated with the prior art discussed above. Specifically, with the configuration of the gas-insulated switchgear discussed in Japanese Patent Application Laid-Open 2003-219520, the operating device of the bus-use grounding switch is disposed in the opposite direction from the circuit breaker with respect to the bus. Accordingly, the length of the gas-insulated switchgear is not determined by the circuit length alone, and the amount by which the operating device sticks out from the bus-use grounding switch must be added to the circuit length. This results in the disadvantage of the gas-insulated switchgear being larger.

With the technique discussed in Japanese Patent Application Laid-Open H10-304521, since the operating device is attached to the branch pipes in the opposite direction from that of the circuit breaker, the length in the circuit direction is extended by a corresponding amount. Furthermore, with the technique discussed in Japanese Patent Application Laid-Open H3-159506, since the operating devices is disposed in the opposite direction from the circuit breaker with respect to the bus, this once again leads to a situation in which the length is extended in the circuit direction.

Thus, when a plurality of circuits or bus apparatuses are incorporated into a gas-insulated switchgear, the length of the gas-insulated switchgear is not determined by the length of the circuits alone, but is also affected by the layout of the bus apparatuses, and this can end up making the product larger. Therefore, in order to reduce the length of a gas-insulated switchgear, there has been a need for a gas-insulated switchgear that is compact, in which the length of the device is determined by the circuit length alone, and is not affected by the layout of the bus apparatuses.

SUMMARY OF INVENTION

The present invention was conceived in an effort to solve the above problems, and it is an object thereof to provide a gas-insulated switchgear that can be made smaller and causes less increase in length in the circuit direction, by means of an improvement to the layout configuration of the operating rod of a bus-use grounding switch.

To achieve the stated object, the present invention is a gas-insulated switchgear in which a bus is disposed in front thereof, having: a bus apparatus unit in which a bus-use grounding switch is disposed on a bus; and a feeder circuit unit in which a line-side disconnecting switch, a circuit breaker and a bus-side disconnecting switch including the bus are continuously disposed, wherein an operating rod is vertically disposed in the bus-use grounding switch so as to be substantially perpendicular to a bus axis above or below the bus, an operating device for driving the operating rod is linked to the operating rod, and the operating device is disposed along an extension of an end part of the operating rod on a side opposite the bus.

With the gas-insulated switchgear of the present invention, the operating rod of the bus-use grounding switch is vertically disposed so as to be substantially perpendicular to the bus axis, and the operating device is disposed along an extension thereof, which keeps it from sticking out from the bus in the opposite direction of the circuit breaker, so there is no increase in the length in the circuit direction, and the device can be made smaller.

DESCRIPTION OF EMBODIMENTS

Examples of embodiments of the gas-insulated switchgear pertaining to the present invention will now be described in specific terms through reference to the drawings. The following embodiments pertain to a gas-insulated switchgear in which a bus is disposed in front thereof.

(1) Typical Embodiment

[Configuration]

Figure 1:
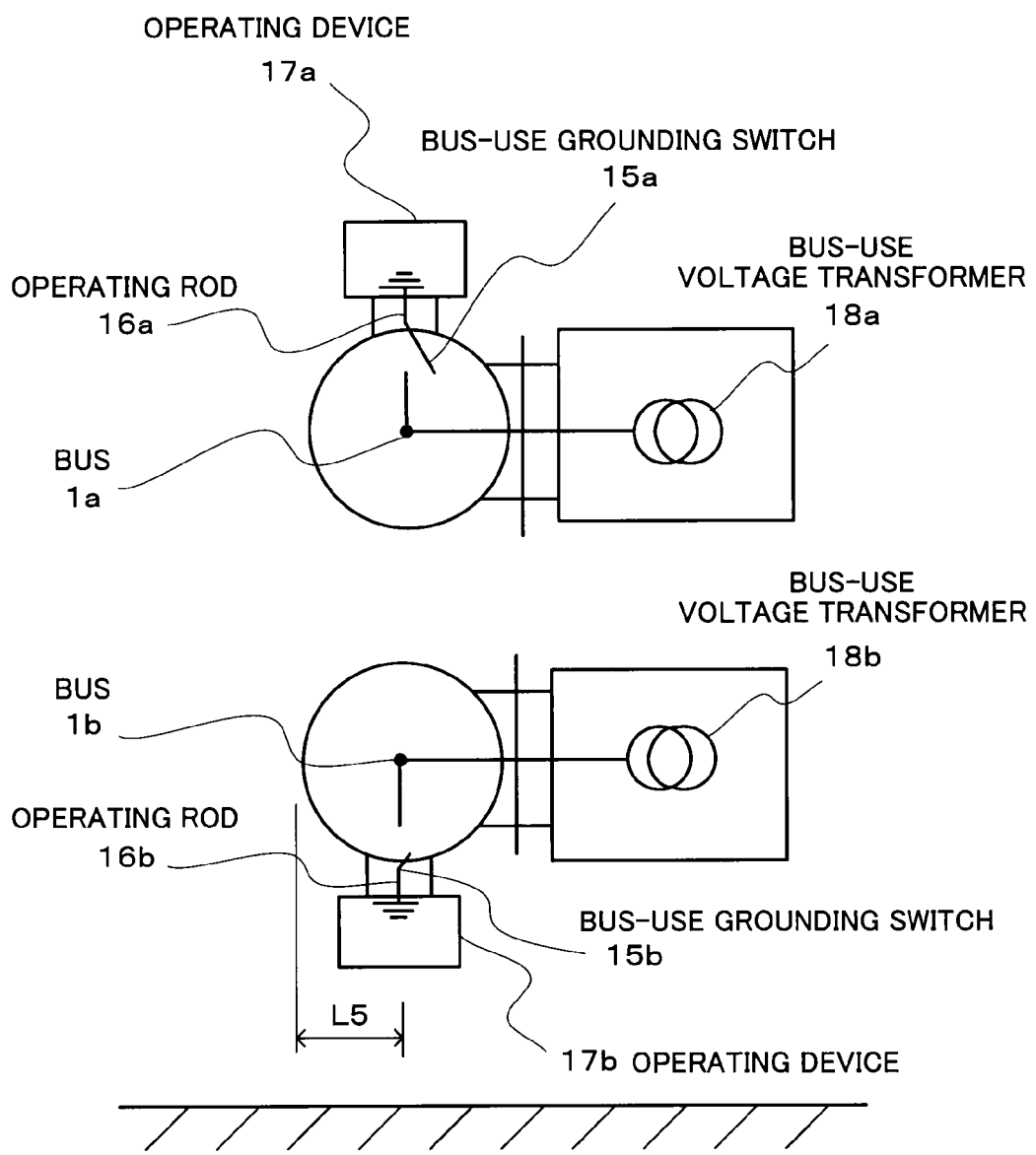
FIG. 1 is a side view of a bus apparatus unit in a typical embodiment of the present invention.
Figure 2:
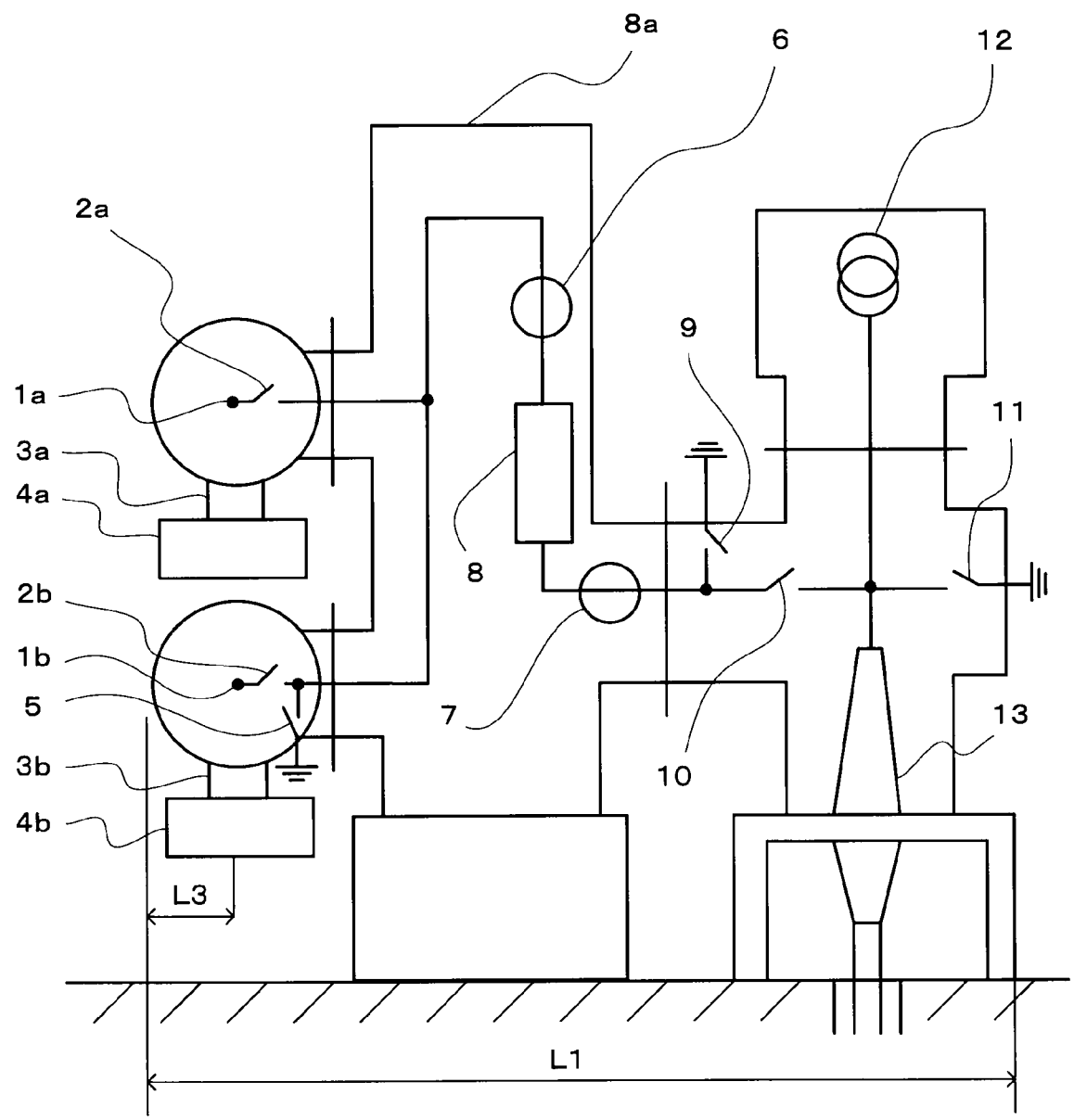
FIG. 2 is a side view of a feeder circuit unit in a typical embodiment of the present invention.
Figure 3:
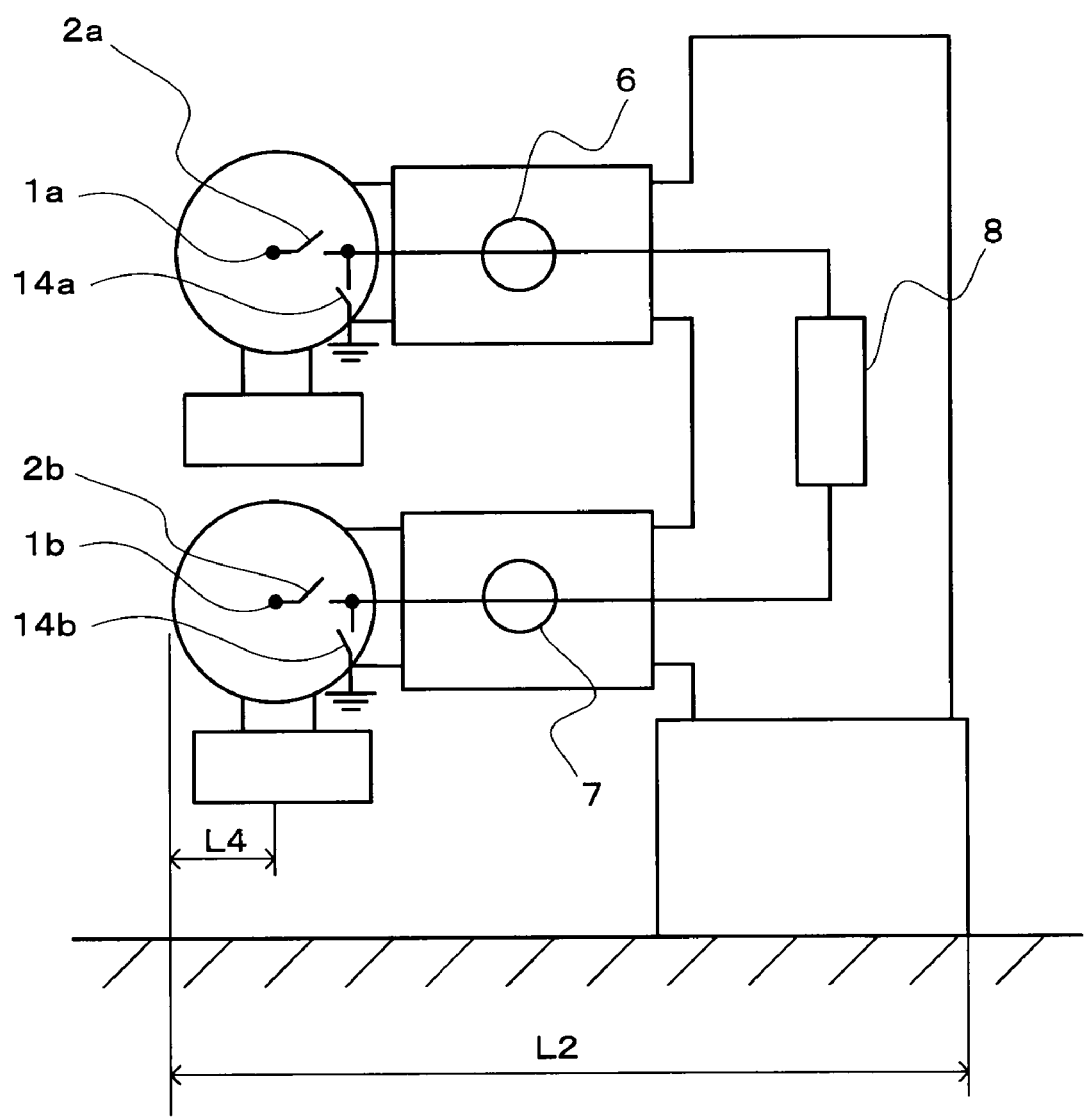
FIG. 3 is a side view of a bus tie circuit unit in a typical embodiment of the present invention.

First, a typical embodiment of the present invention will be described through reference to FIGS. 1 to 5. FIG. 1 is a side view of the device configuration in a bus apparatus unit. FIG. 2 is a side view of the device configuration in a feeder circuit unit. FIG. 3 is a side view of the device configuration in a bus tie unit.

Figure 4:
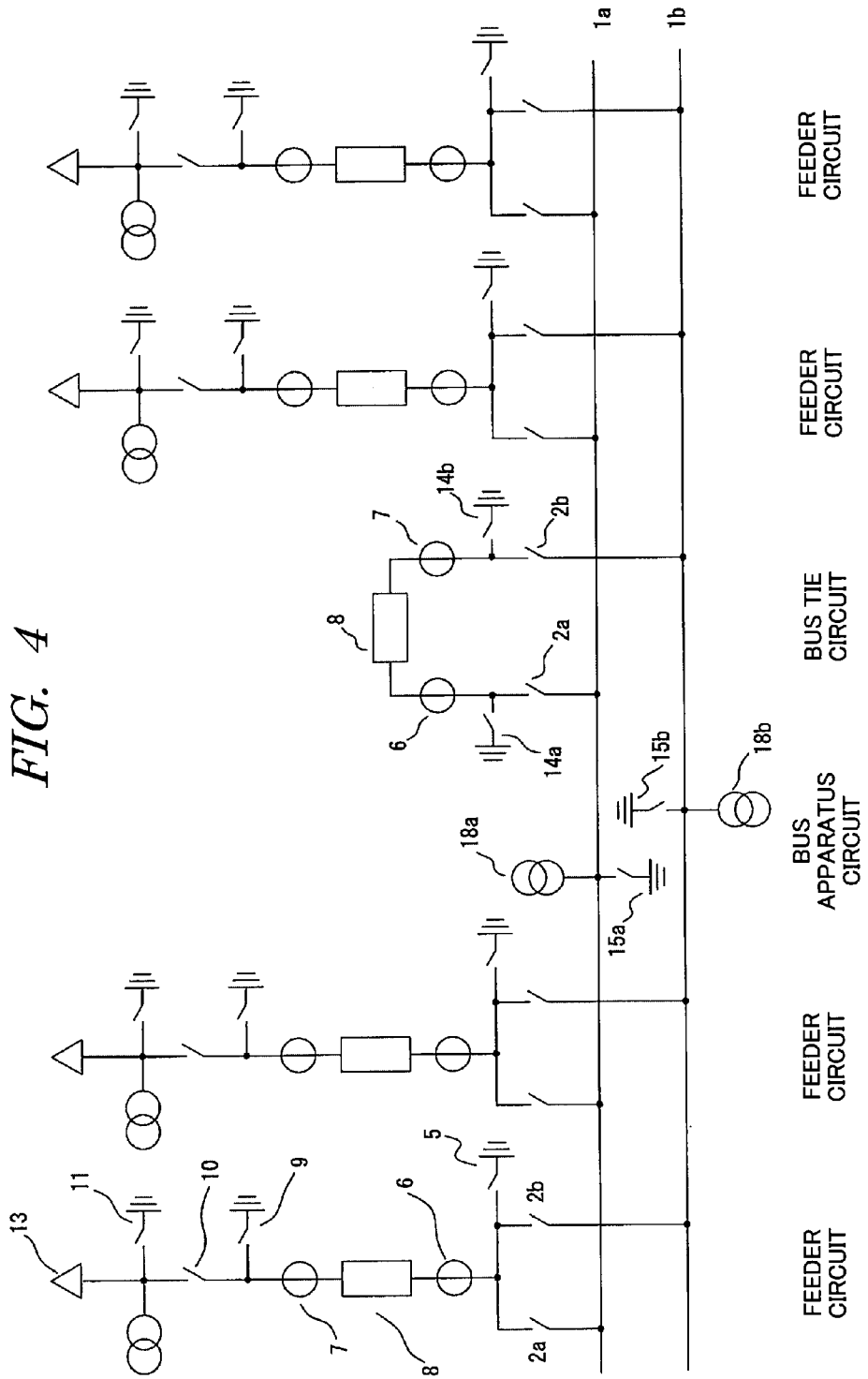
FIG. 4 is a single-line diagram of a typical double bus arrangement.

FIG. 4 is a single-line diagram of a typical double bus arrangement of gas-insulated switchgear, in which each unit is composed of four feeder circuits, one bus tie circuit, and one bus apparatus circuit. This embodiment is expressed as a double bus arrangement as shown in the single-line diagram of FIG. 4, but can also be applied to a single bus arrangement of gas-insulated switchgear.

Figure 5:
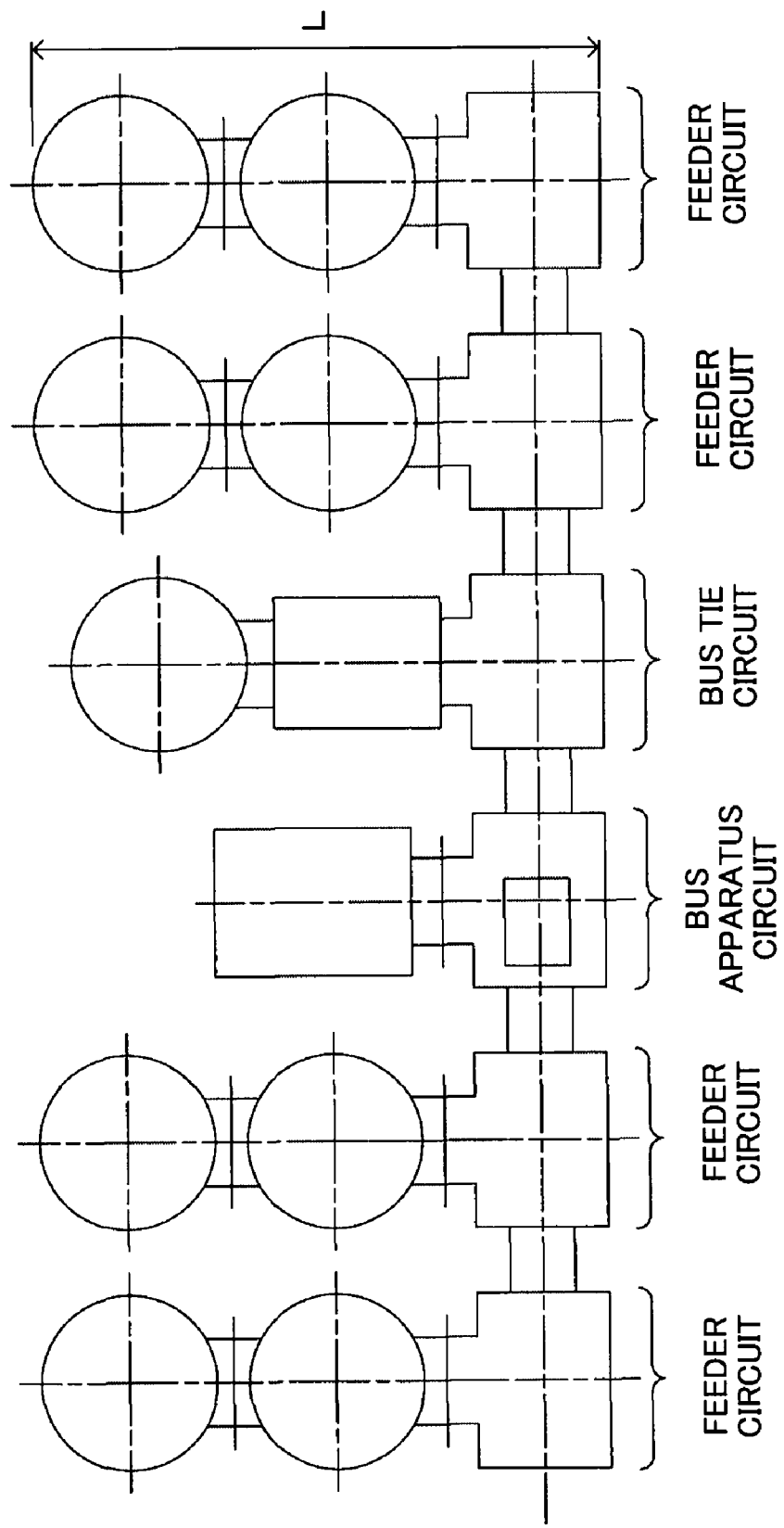
FIG. 5 is a plan view of a typical embodiment.

FIG. 5 is a plan view of this embodiment. As shown in FIG. 5, the gas-insulated switchgear pertaining to this embodiment is made up of units that are continuously connected. L in FIG. 5 indicates the length of the gas-insulated switchgear in the circuit layout direction. Also, as shown in FIG. 5, in this Specification the terms "circuit breaker direction" and "opposite direction from that of the circuit breaker" mean, respectively, the direction on the circuit breaker side in the circuit layout direction when the center of the bus is the view point of reference, and the direction on the opposite side.

The device configuration of a feeder circuit unit will be described through reference to FIG. 2. Buses 1a and 1b are horizontally disposed in such a manner that they vertically overlap each other, and bus-side disconnecting switches 2a and 2b are horizontally disposed so as to be perpendicular to the axis of the buses 1a and 1b. Operating shafts 3a and 3b for driving the operating rods of the bus-side disconnecting switches 2a and 2b are attached to the lower part of the bus-side disconnecting switches 2a and 2b, and operating devices 4a and 4b are disposed via the operating shafts 3a and 3b. The operating devices 4a and 4b are disposed substantially at the lower part of the buses 1a and 1b.

A maintenance and inspection-use grounding switch 5 on the bus side of a circuit breaker 8 is provided to the bus-side disconnecting switch 2b. A current transformer 6, a circuit breaker main body 8, and a current transformer 7 are continuously connected along an extension of the bus-side disconnecting switches 2a and 2b (the opposite side from the buses 1a and 1b). The current transformer 6, the circuit breaker main body 8, and the current transformer 7 are housed in a gas container 8a for the circuit breaker unit. The terminals of the current transformer 7 are connected to line-side apparatuses, namely, a line-side maintenance and inspection-use grounding switch 9 and a line-side disconnecting switch 10 of the circuit breaker 8, and a line-use grounding switch 11, with a line-use voltage transformer 12 being disposed above those apparatuses 9 through 11 and a power cable 13 below the apparatuses 9 through 11.

Next, FIG. 3 shows the device configuration of a bus tie circuit unit. Specifically, the bus-side disconnecting switches 2a and 2b are disposed on the buses 1a and 1b in the same configuration as with the above-mentioned feeder circuit, and maintenance and inspection-use grounding switches 14a and 14b of the circuit breaker 8 are provided on the buses 1a and 1b side. The current transformers 6 and 7 are connected to the maintenance and inspection-use grounding switches 14a and 14b, respectively, and connected with the circuit breaker 8.

The device configuration of the bus apparatus unit, which is a main component in this embodiment, will now be described through reference to FIG. 1. Operating rods 16a and 16b of bus-use grounding switches 15a and 15b are vertically disposed with respect to the buses 1a and 1b, which are horizontally disposed in such a manner that they vertically overlap each other, so as to be substantially perpendicular to the axis of the buses 1a and 1b, and operating devices 17a and 17b are disposed along an extension of the other ends of the operating rods 16a and 16b (the ends on the opposite side from the buses 1a and 1b), respectively. Bus-use voltage transformers 18a and 18b are horizontally disposed in such a manner that they vertically overlap each other, and are respectively connected in the circuit breaker direction of the buses 1a and 1b (the direction on the circuit breaker side in the circuit unit layout direction when the center of the buses 1a and 1b is the view point of reference).

[Operation and Effect]

This embodiment constituted as above has the following effect. In the feeder circuit unit, the bus tie circuit unit, and the bus apparatus unit, the distances L3 (shown in FIG. 2), L4 (shown in FIG. 3), and L5 (shown in FIG. 1) from the center of the buses 1a and 1b in the opposite direction from the circuit breaker 8 in these respective units are also substantially the same length, and the length L of the gas-insulated switchgear in the circuit layout direction (shown in FIG. 5) can be determined by the length L1 of the feeder circuit (shown in FIG. 2) or the length L2 of the bus tie circuit (shown in FIG. 3).

This is because the length L5 by which the buses 1a and 1b stick out from the center in the bus apparatus unit is substantially the same as the lengths L3 and L4 that they stick out in the other units, and has no effect on the gas-insulated switchgear circuit length direction. Furthermore, since the bus-use grounding switches 17a and 17b are disposed above and below the buses 1a and 1b, what was dead space in the past can now be utilized effectively.

Thus, with this embodiment, the operating rods 16a and 16b of the bus-use grounding switches 17a and 17b are disposed vertically and substantially perpendicular to the axis of the buses 1a and 1b, and the operating devices 18a and 18b are provided along an extension of the other ends of these operating rods (the ends on the opposite side from the buses 1a and 1b), which eliminates protrusion in the opposite direction of the circuit breaker, so there is no increase in the height of the gas-insulated switchgear. As a result, the gas-insulated switchgear as a whole can be made smaller.

(2) Other Embodiments

The present invention is not limited to the above embodiment, and various modifications can be made to the configuration or layout of the various devices. More specifically, the present invention also encompasses the embodiments shown in FIGS. 6 and 7. In the embodiments shown in FIGS. 6 and 7, those components that are the same as in the first embodiment given above are numbered the same, and will not be described redundantly.

With the embodiment shown in FIG. 6, the operating device 17a of the bus-use grounding switch 15a in the upper bus 1a is disposed below the bus, so that the layout directions of the operating devices 17a and 17b of the upper and lower bus-use grounding switches 15a and 15b with respect to the buses 1a and 1b are both matched to the downward direction. Also, with the embodiment in FIG. 7, the operating device 17b of the bus-use grounding switch 15b of the lower bus 1b is disposed above the bus, so that the layout directions of the operating devices 17a and 17b of the upper and lower bus-use grounding switches 15a and 15b with respect to the buses 1a and 1b are both matched to the upward direction.

Figure 6:
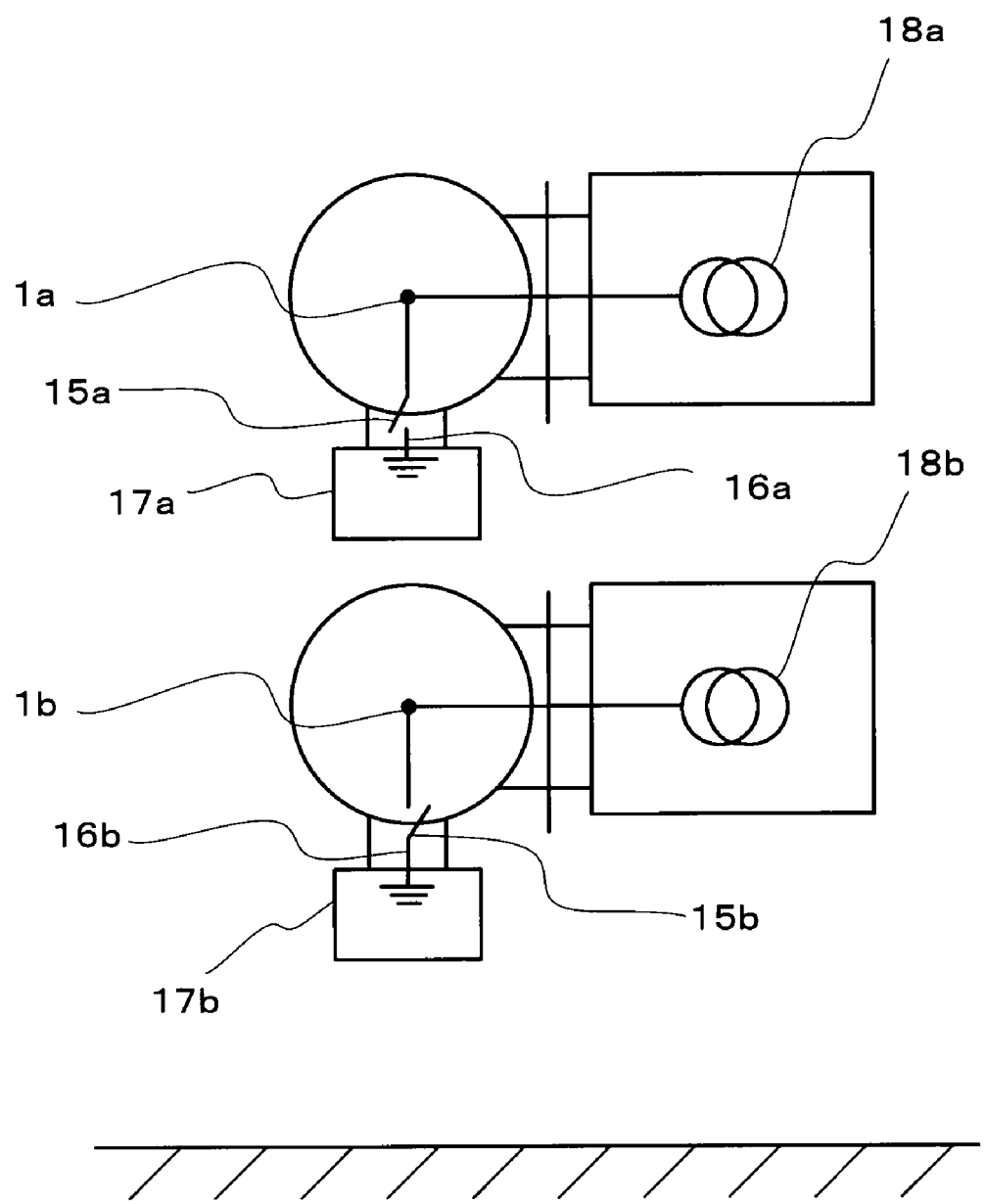
FIG. 6 is a side view of a bus apparatus unit in another typical embodiment of the present invention.
Figure 7:
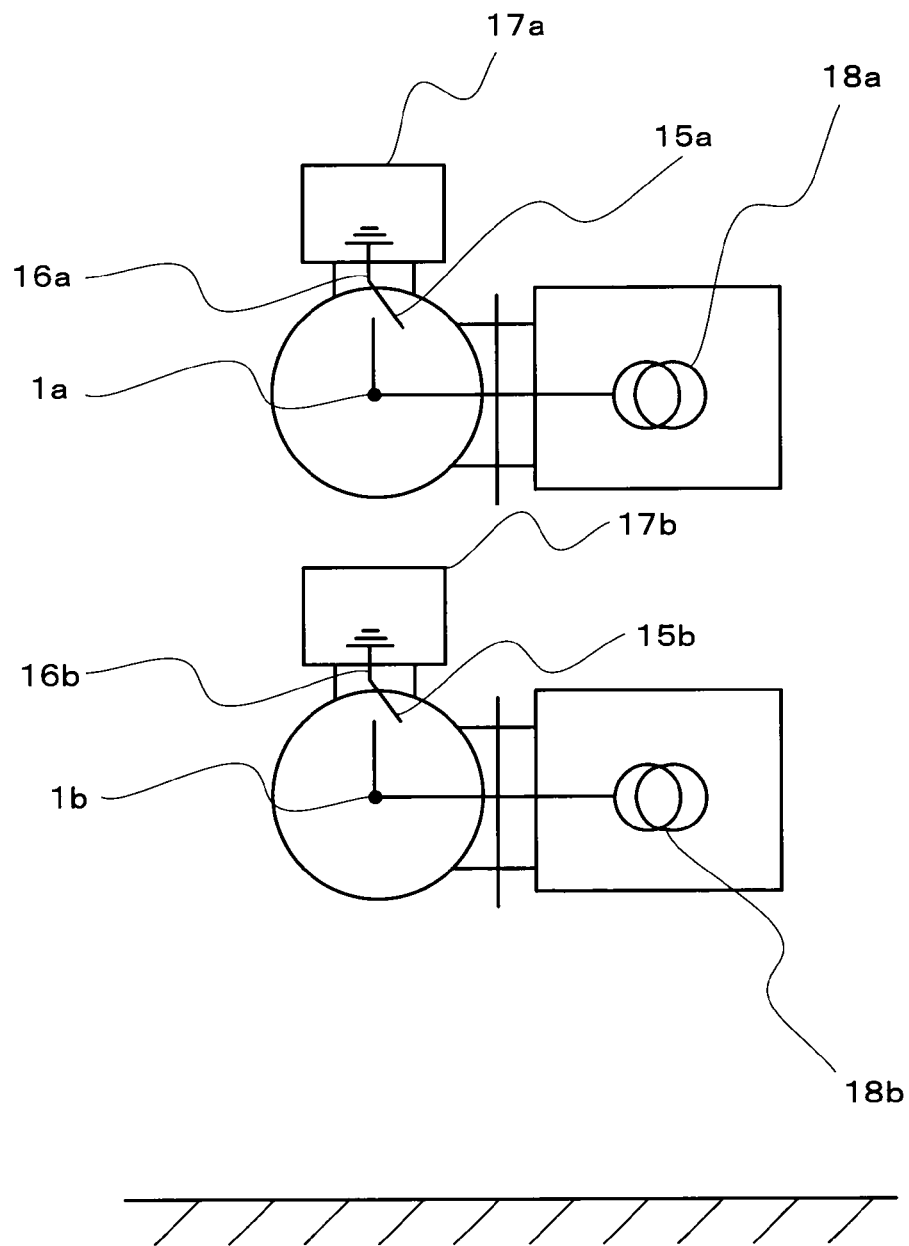
FIG. 7 is a side view of a bus apparatus unit in another typical embodiment of the present invention.

With these embodiments shown in FIGS. 6 and 7, in addition to the effect of reducing the size of the gas-insulated switchgear that was attained in the typical embodiment given above, the bus-use grounding switches 15a and 15b can also have the same structure. Accordingly, standardization of devices can be improved, and this reduces cost.

The invention claimed is:

1. A gas-insulated switchgear in which a bus is disposed in front thereof, comprising:
  a bus apparatus unit including two buses, each bus having a bus-use grounding switch disposed thereon, the buses being housed in containers; and
  a feeder circuit unit in which a circuit breaker and a line-side disconnecting switch are continuously disposed at a back of two bus-side disconnecting switches disposed on the buses, respectively,
  wherein the bus apparatus unit and the feeder circuit unit are arranged such that directions of circuit layout of the bus apparatus unit and the feeder circuit unit are substantially parallel,
  wherein the two buses in common between the bus apparatus unit and the feeder circuit unit are horizontally disposed such that the two buses vertically overlap,
  wherein two operating rods are vertically disposed, respectively, in the bus-use grounding switches disposed on the two buses, respectively, so as to be substantially perpendicular to a bus axis,
  wherein two operating devices for driving the two operating rods are linked to an end part of each operating rod on a side opposite the buses, and
  wherein the two operating devices are disposed in a direction of an upper or a lower part of the two buses, respectively, thereby preventing the containers housing the two buses from extending out forward due to the two operating devices, so as to reduce a length in a direction of circuit layout of the gas-insulated switchgear including the bus apparatus unit and the feeder circuit unit.

2. The gas-insulated switchgear according to claim 1, wherein the bus apparatus unit includes two bus-use voltage transformers, and
  wherein the two bus-use voltage transformers are horizontally disposed so as to be substantially perpendicular to the bus axis, and are connected at a back of the two buses, respectively.

* * * * *